Figure 1:
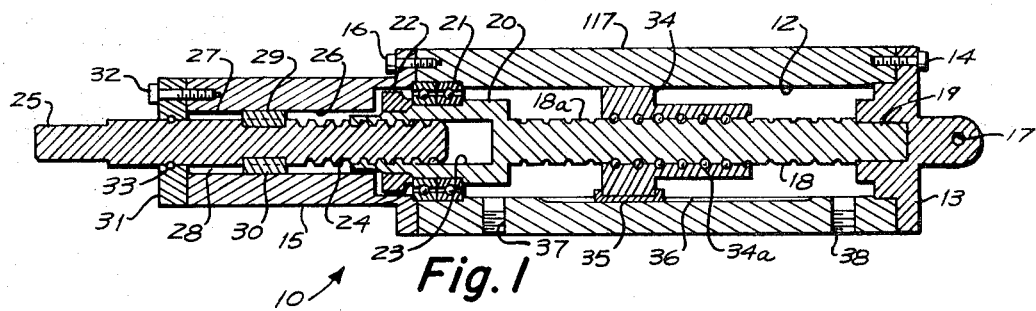

United States Patent [19]
Beichel et al.

[11] 3,763,747
[45] Oct. 9, 1973

[54] FLUID-OPERABLE LINEAR ACTUATORS

[75] Inventors: Rudi Beichel; Clifton J. Reynolds, both of Sacramento County, Calif.

[73] Assignee: Aerojet-General Corporation, El Monte, Calif.

[22] Filed: June 28, 1971

[21] Appl. No.: 157,296

[52] U.S. Cl. .................. 92/33, 74/110, 74/424.8 R
[51] Int. Cl. .......................... F01b 3/00, F16h 21/44
[58] Field of Search ................. 92/31, 33; 74/110, 74/89.15, 424.8

[56] References Cited
UNITED STATES PATENTS

| | | | |
|---|---|---|---|
| 3,422,696 | 1/1969 | Valenti | 74/424.8 R |
| 3,046,808 | 7/1962 | Mart | 74/424.8 R |
| 1,914,374 | 6/1933 | Kerns | 74/110 |
| 2,224,708 | 12/1940 | Sittert | 74/110 |
| 3,153,372 | 10/1964 | Calvert | 74/424.8 R |
| 3,349,927 | 10/1967 | Blatt | 74/110 |
| 3,200,664 | 8/1965 | Mauric | 74/424.8 R |
| 2,261,450 | 11/1941 | Pritchett | 74/110 |

Primary Examiner—Martin P. Schwadron
Assistant Examiner—A. M. Zupcic
Attorney—Ansell, Angus et al.

[57] ABSTRACT

A linear actuator according to the present disclosure includes an axially reciprocable piston having means controlling the radial position of the piston. Means is provided for imparting fluid pressure to opposite sides of the piston causing the piston to move axially. The piston is threadably engaged to a drive means so that axial movement of the piston imparts rotation movement to the drive means. An axially moveable thrust rod is threadably assembled to the drive means so that rotation of the drive means imparts axial motion to the thrust rod. In one form of the device, the piston is threadably engaged to the thrust rod which in turn is restrained from rotational movement. The piston is also threadably engaged to a sleeve which rotates with the piston, the sleeve being threadably engaged to the thrust rod so that radial movement of the sleeve drives the thrust rod axially. In another form of the device the piston is keyed to a key slot in a cylindrical bore, the key slot being helically wound so that the advance of the thrust rod is dependent upon the algebraic sum of the advance of the threaded assembly and the advance of the helical key slot.

11 Claims, 6 Drawing Figures

INVENTORS
RUDI BEICHEL
CLIFTON J. REYNOLDS
BY
ATTORNEY

FLUID-OPERABLE LINEAR ACTUATORS

This invention relates to linear actuators, and particularly to linear actuators operable by fluid pressure.

Linear actuators are useful as control devices for controlling relative movement of moveable elements. For example, linear actuators are useful for controlling the position of fluid control valves for rocket engines for operating fluid valves, for operating wing flaps and retractable wheels on aircraft, and many other applications in which relative movement between two elements is desired.

In rocket engines, particularly of the class utilized as space vehicles, pressurized gas is ordinarily utilized for operating of controls, purging fuel streams, and for other purposes. Particularly for advanced cryogenic engines, the fuel and oxidizer frequently become gaseous at relatively low temperatures during engine operation. Heretofore, attempts have been made to utilize the high pressure gases to actuate controls, particularly those controls associated with attitude control, but direct cylinder-to-piston actuation has been impractical due to the inherent compressibility of the gaseous system and the resultant oscillatory "seeking" of a desired null position.

It is an object of the present invention to provide a fluid operable linear actuator capable of imparting linear motion to an element.

It is another object of the present invention to provide a fluid operable linear actuator which may be operated at relatively low temperatures, such as by fluids at cryogenic temperatures.

It is another object of the present invention to provide a linear actuator which is operable by pressurized fluid, which actuator provides more precise linear position control without significant drift than provided by prior actuators.

A linear actuator according to the presently preferred embodiment of the present invention comprises an axially reciprocable piston having means controlling the radial position of said piston. Means is provided for imparting fluid pressure to opposite sides of the piston causing the piston to move axially along the actuator. The piston is threadably engaged to a drive means, so that axial movement of the piston imparts rotational movement of the drive means. A linearly moveable thrust rod is threadably assembled to the drive means so that rotation of the drive means imparts axial movement to the thrust rod.

According to one modification of the present invention, the piston is threadably engaged to the thrust rod which in turn is restrained from rotational movement. The piston is also engaged to sleeve means which rotates with the piston; the sleeve also being threadably engaged to the thrust rod so that radial movement of the sleeve drives the thrust rod axially.

According to another modification of the present invention, the piston is keyed to a key slot in the actuator housing. The key slot may extend parallel to the actuator axis, thereby restraining the piston from radial movement, or, alternatively, the key slot may be helically wound so that the advance of the thrust rod is dependent upon the algebraic sum of the advance of the threaded assembly and the advance of the helical key slot.

One feature of the present invention resides in the provision of means preventing the thrust rod from rotation about its axis.

Another feature of the present invention resides in the provision of a low friction threaded engagement between the piston and the drive means.

Another feature of the present invention resides in the selection of the pitch angle of the threads engaging the drive means to the thrust rod so that external forces on the thrust rod do not affect the radial position of the drive means.

In accordance with yet another feature of the present invention, the force imparted on the piston is isolated from external forces on the thrust rod so that loading on the thrust rod does not induce motion of the piston due to the compressibility of the actuating fluid.

Figure 4:
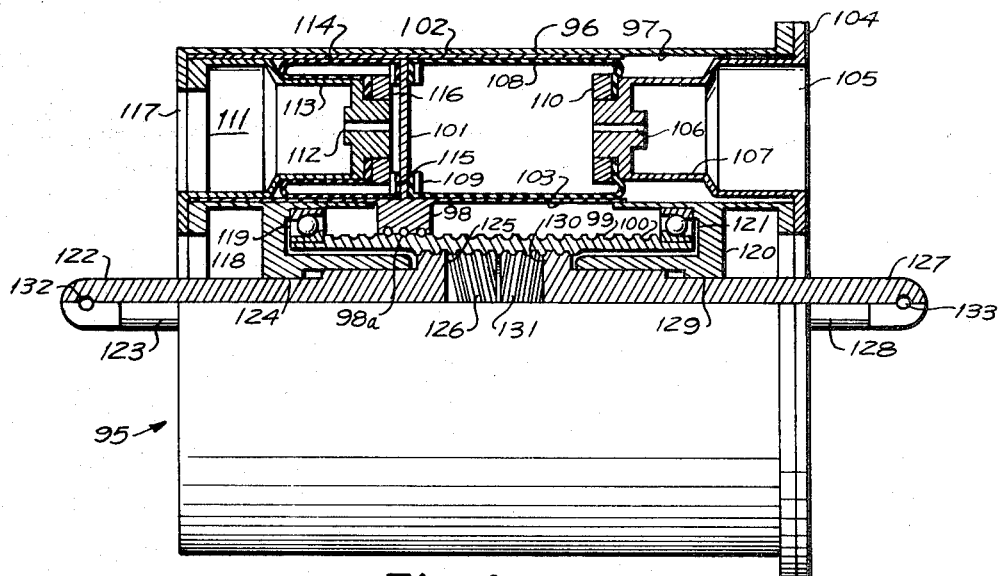
Figure 5:
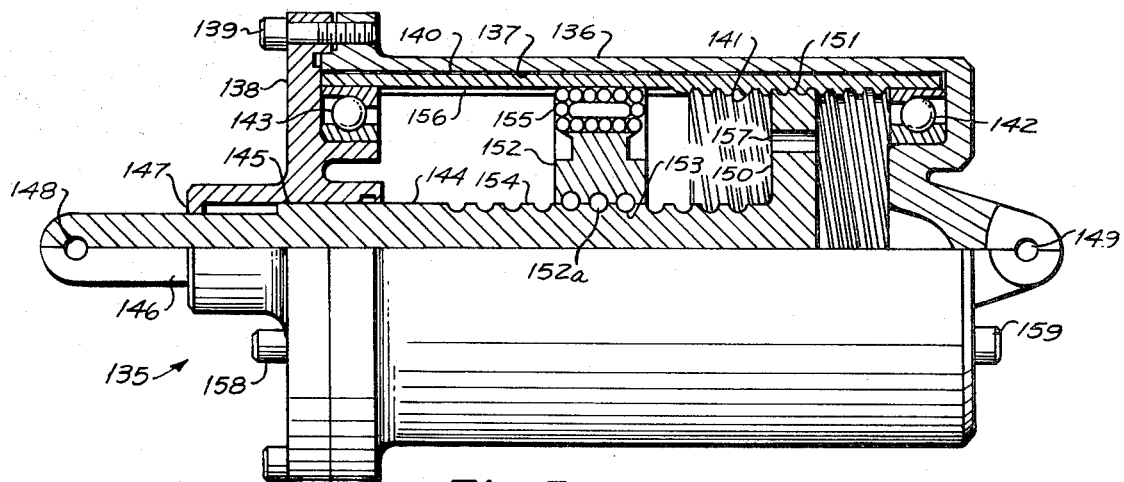
Figure 6:
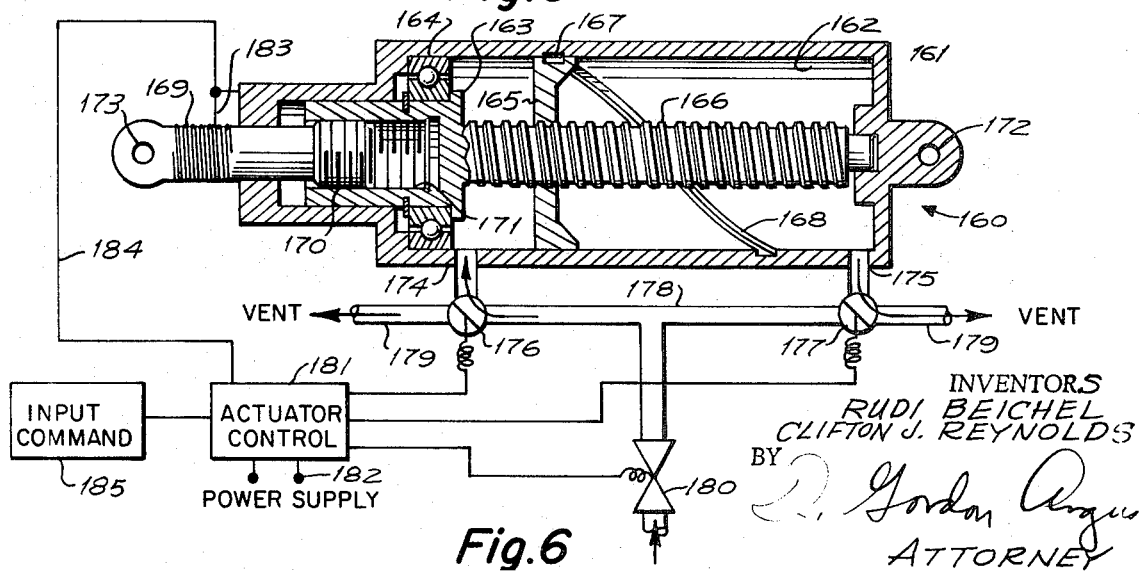

The above and other features of this invention will be more fully understood from the following detailed description and the accompanying drawings, in which:

FIG. 1 is a side view elevation, in cutaway cross-section, of a linear actuator in accordance with the presently preferred embodiment of the present invention;

FIGS. 2–5 are side view elevations, partly in cutaway cross-section, of linear actuators in accordance with respective modifications of the present invention; and FIG. 6 is a side view elevation, partly in cutaway cross-section, of a linear actuator in accordance with yet another modification of the present invention coupled to control apparatus according to the present invention for controlling the linear movement of a thrust rod associated with the actuator.

Referring to the drawings, and particularly to FIG. 1, there is illustrated a linear actuator 10 having a substantially cylindrical housing 11 having an internal bore 12. Bore 12 is closed at one end by plate 13, which may be fastened to housing 11 by suitable threaded fasteners 14, and is closed at the opposite end by plate 15, which may also be fastened to housing 11 by suitable threaded fasteners 16. Plate 13 may be provided with suitable means, such as an aperture 17, for attachment to an element. By way of example, a fastener (not shown) attached to a stationary item on a rocket may be coupled to aperture 17 to fixedly position housing 11.

Drive shaft 18 is journaled to plate 13 by bearing surface 19, and includes a shank 20 journaled to housing 11 by bearings 21. Lock-nut 22 is fastened to shank 20 to hold bearing 21 in place. Shaft 18 includes an internally threaded bore 23 which is threadably assembled to threaded portion 24 of thrust rod 25.

Plate 15 includes a bore 26, having key slots 27 and 28 adapted to receive keys 29 and 30 which are mounted to thrust rod 25 to restrain rod 25 from rotational movement. Cap 31 closes the end of bore 26, and may be assembled to plate 15 by means of threaded fasteners 32. The shank of thrust rod 25 extends through cap 31, and seal means 33, such as a suitable O-ring, provides a fluid seal between the rod and cap.

Piston 34 is threadably assembled to threaded portion 18a of drive shaft 18 by means of ball screw 34a or suitable low friction means. Ball screw 34a provides a low friction threaded assembly between piston 34 and shaft 18. Seal means (not shown) may be mounted on piston 34 to provide a fluid seal between the piston and the threaded portion 18a of shaft 18. Piston 34 carries key 35 adapted to be received in key slot 6 in bore 12 to prevent rotation of piston 34 with respect to the housing. If desired, suitable seal means (not shown) may be provided on piston 34 to provide a fluid seal between the piston and the wall of bore 12. Ports 37 and 38 are provided in housing 11 to provide fluid communication into the region of bore 12 on each side of piston 34.

In operation of the linear actuator illustrated in FIG. 1, and assuming housing 11 is attached to a stationary object by means of fastening means 17, fluid pressure admitted through port 37 operates on the face of piston 34 to drive piston axially in one direction (to the right as illustrated in FIG. 1). Movement of piston 34 along the axis of the actuator will impart relative rotation to shaft 18 by action of the threaded assembly between the piston and shaft. The direction of rotation of shaft 18 will depend upon the direction of advance of the screw threads. Rotation of shaft 18 about its axis will impart linear motion to thrust rod 25 by virtue of the threaded assembly between the shaft and the rod. Thrust rod 25 is restrained from rotation by virtue of keys 29 and 30 in key slots 27 and 28, respectively, and rotation of piston 34 is restrained by virtue of key 35 in slot 36. Hence, only shaft 18 is permitted to rotate, thereby causing linear movement of thrust rod 25 along the axis of the actuator.

Figure 2:
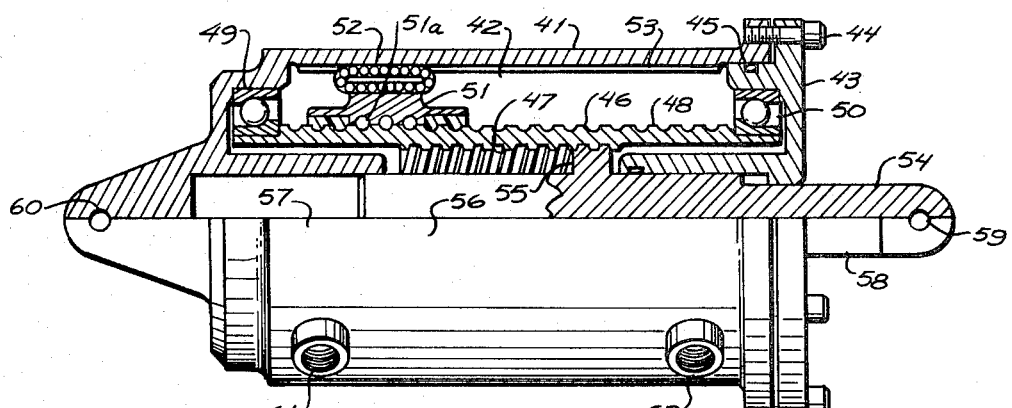

FIG. 2 illustrates a linear actuator 40 in accordance with a modification of the present invention. Actuator 40 includes a housing 41 having an internal bore 42. Plate 43 is fastened to housing 41 by means of threaded fasteners 44 to close the open end of bore 42. Preferably, seal means 45 is provided at the interface between plate 43 and housing 41 to provide a fluid seal between them. The opposite end of bore 42 from header plate 43 is closed by an end of housing 41.

Drive shaft 46, having an internally threaded portion 47 and an externally threaded portion 48, is journaled to housing 41 by means of bearing 49 and is journaled to plate 43 by means of bearing 50. Piston 51 includes a threaded portion which is threadably engaged by means of low friction ball-screws 51a or suitable low friction means to threaded portion 48 of shaft 46. Bearing key 52 is attached to piston 51 and is adapted to be received in key slot 53 of housing 41. Bearing key 52 is of the class adapted to provide minimal resistance to the movement of piston 51 along the axis of the actuator.

Thrust rod 54 includes a threaded portion 55 threadably engaged to threaded portion 47 of shaft 46. A portion of the shank 56 of thrust rod 54 is journaled to bore 57 of housing 41. Shank 58 of thrust rod 54 extends through an opening in header 43 and includes fastening means 59 adapted to be attached to an element to be moved. Thrust rod 54 is restrained from rotational movement by the non-circular, such as square, configuration of shank 58 extending through a corresponding non-circular opening in plate 43. Alternatively, suitable key and key slot means (not shown) may be utilized between plate 43 and rod 54 to restrain the rod from rotational movement. Housing 41 also includes fastening means 60 at the opposite end of the actuator from fastener means 59 for attachment of housing 41 to a fixed position. Ports 61 and 62 provide fluid communication to opposite sides of piston 51 so that fluid under pressure may be selectively introduced to opposite sides of the piston.

The operation of the actuator 40 illustrated in FIG. 2 is similar to that of the operation of the actuator illustrated in FIG. 1. Fluid under pressure introduced through port 61 forces piston 51 to the right (as illustrated in FIG. 2) causing rotation of drive shaft 46 in one direction, thereby retracting thrust rod 54 along the axis of the actuator. Fluid under pressure introduced through port 62 forces the piston in the opposite direction, imparting rotation to shaft 46 in the opposite direction, thereby extending thrust rod 54.

Figure 3:
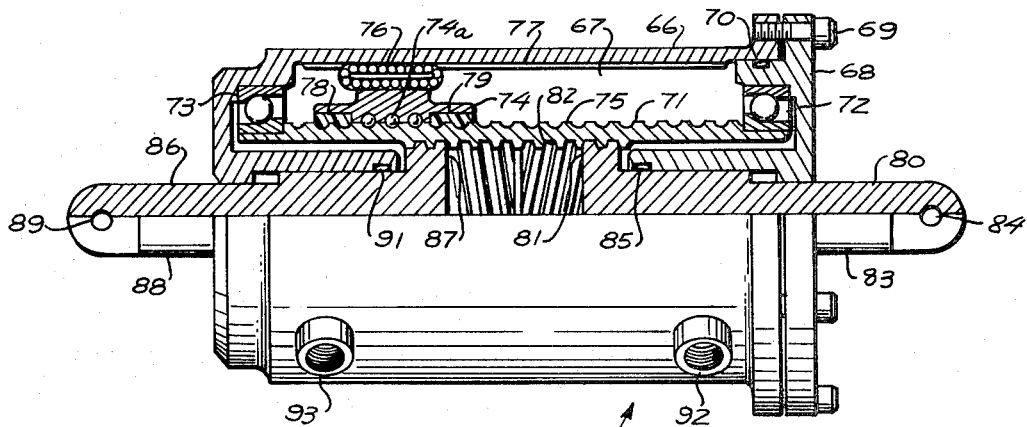

FIG. 3 illustrates linear actuator 65 in accordance with another modification of the present invention. Actuator 65 includes a housing 66 having an internal bore 67. Plate 68 is fastened to housing 66 by means of suitable threaded fastener 69 to close the end of bore 67. Seal 70 provides a fluid seal between housing 66 and plate 68. Drive shaft 71 is journaled to plate 68 by means of bearing 72 and is journaled to housing 66 by means of bearing 73. Piston 74 is threadably assembled to threaded portion 75 of shaft 71 by means of ball-screws 74a or suitable low friction means, and includes bearing key 76 adapted to be received within key slot 77 in bore 67. Key 76, like key 52 of the embodiment illustrated in FIG. 2, is of the type which provides minimal resistance to axial movement of piston 74. Preferably, piston 74 includes one or both of seals 78 and 79 at each end thereof adapted to engage threaded portion 75 to provide a fluid seal between threaded portion 75 and piston 74. Thrust rod 80 includes threaded portion 81 engaged to threaded portion 82 of shaft 71. The shank 83 of thrust rod 80 may be non-circular or keyed to plate 68 and includes fastener means 84 adapted to be connected to an element to be moved. Preferably seal 85, such as a suitable O-ring, provides a fluid seal between thrust rod 80 and plate 68. A second thrust rod 86 has a threaded portion 87 threadably engaged to threaded portion 82 to shaft 71. The shank 88 of thrust rod 86 may be non-circular or may be keyed to housing 66 to restrain rotation of rod 86. Shank 88 extends through an aperture in housing 66. Fastening means 89 adapted to be attached to an element to be moved is provided at one end of rod 86. Seal 91 provides a fluid seal between housing 66 and thrust rod 86. Ports 92 and 93 provide fluid communication to opposite sides of piston 74 so that fluid under pressure may be selectively applied to the piston to move the piston along the axis of the actuator. It is preferred that the portions of the shanks 83 and 88 of thrust rods 80 and 86, respectively, that pass through the apertures in header 68 and housing 66 be provided with at least one surface which is not at a uniform distance from the axis of the actuator. For example, shanks 83 and 88 may be substantially square or rectangular, and may pass through substantially similar square or rectangular apertures so that the thrust rods 80 and 86 will not rotate about the axis of the actuator.

In operation of the actuator illustrated in FIG. 3, fluid under pressure applied through port 93 applies a force to one surface of piston 74 thereby driving piston 74 to the right (as illustrated in FIG. 3). Since the piston is keyed by means of key 76 and key slot 77 from rotation, the piston does not rotate, and the axial movement of piston 74 causes rotational movement of shaft 71 about the axis of actuator. Rotational movement of drive shaft 71 causes thrust rods 80 and 86 to move axially along the axis of the thrust rod. Preferably, the internal threaded portion 82 of shaft 71 is such that the thread advance for one thrust rod is opposite from the direction of the other thrust rod so that the thrust rods move in opposite directions. Hence, as piston 74 moves to the right (as illustrated in FIG. 3) both thrust rods 80 and 86 are retracted, whereas as piston 74 moves to the left (as illustrated in FIG. 3) both actuator rods move outwardly. If desired, differently pitched threads may be employed on thrust rods 80 and 86 so that high axial thrust results from small motion. One feature of the device illustrated in FIG. 3 resides in the fact that external loads are supported by the two thrust rods through drive shaft 71 without affecting the load on bearings 72 and 73.

FIG. 4 illustrates actuator 95 in accordance with another modification of the present invention. Actuator 95 includes a housing 96 having a bore 97. Piston 98 is threadably assembled to threaded portion 99 of drive shaft 100 by means of ball-screw 98a or suitable low friction means. Piston 98 includes bearer wall 101 and a pair of substantially concentric sleeves 102 and 103. Hence bearer wall 101 forms a substantially ring-shaped wall about the axis of actuator 95. Plate 104 closes one end of bore 97 and includes port 105 and aperture 106 providing fluid communication between port 105 and the region adjacent one side of bearer wall 101. Port 105 also includes a portion 107 of reduced diameter for purposes to be hereinafter explained.

Substantially toroidal diaphragm 108 is positioned between sleeves 102 and 103 and is attached, on one side to bearer wall 101 by washer 109 and is attached to port 105 by washer 110.

A second port 111 is positioned within housing 96 and is in fluid communication via aperture 112 to the opposite side of bearer wall 101. Port 111 includes a portion of reduced diameter 113 for purposes to hereinafter be explained. A substantially toroidal diaphragm 114 is fastened to bearer wall 101 by washer 115 and is fastened to port 111 by washer 116. Toroidal diaphragm 114 is positioned between sleeve 102 and 103. Port opening 117 is provided in the end wall of housing 96 to provide fluid communication to port 111.

Housing 118 is disposed within housing 96 and sleeve 103 and is journaled to shaft 100 by means of bearing 119. Likewise, housing 120 is disposed within housing 96 and sleeve 103 and is journaled to shaft 100 by means of bearing 121. Actuator thrust rod 122, having a substantially square or non-circular shank 123 passing through a similar opening 124 in housing 118, is threadably assembled by threaded portion 125 to threaded portion 126 of shaft 100. Likewise, thrust rod 127 has a substantially square or non-circular shank 128 passing through a similar opening 129 of housing 120. Alternatively, the thrust rods may be keyed to the respective members to restrain rotation. Thrust rod 127 includes threaded portion 130 which is threadably assembled to threaded portion 131 of shaft 100. Thrust rod 122 includes fastening means 132 for fastening the thrust rod to an element to be moved, and thrust rod 127 includes fastening means 133 adapted to be connected to an element to be moved.

In operation of the actuator illustrated in FIG. 4, fluid under pressure admitted through port 111 passes through aperture 112 to the region inside toroidal diaphragm 114. The increased pressure within diaphragm 114 imposes an axial force on bearer wall 101 of piston 98 thereby moving the piston axially to impart rotational movement to shaft 100. As shaft 100 rotates, thrust rods 122 and 127 are drawn inwardly along the axis of the actuator. On the other hand, when fluid under pressure is admitted through port 105 and aperture 106 to impose a force on the opposite side of bearer wall 101, the piston moves in the opposite direction to impart a rotational movement in the opposite direction to shaft 100 thereby forcing actuator rods 122 and 127 outwardly. The actuating fluid to operate the device is contained in the diaphragms so that other sealing devices are not required.

FIG. 5 illustrates an actuator 135 in accordance with yet another modification of the present invention. Actuator 135 includes a substantially cylindrical housing 136 having a bore 137. Plate 138 encloses one end of bore 137 and is fastened to housing 136 by fasteners 139. Drive sleeve 140, having a threaded portion 141 is journaled to housing 136 by bearings 142 and is journaled to plate 138 by bearings 143. Thrust rod 144 includes a sleeve 145 journaled to header 138, and substantially square or non-circlar portion 146 protruding through opening 147 of header 138. Fastening means 148 is provided at the end of thrust rod 144 for attachment to an element to be moved. Fastener means 149 is provided on housing 136 for fastening the housing to a stationary object. Thrust rod 144 includes an annular portion 150 having a threaded portion 151 threadably engaged to threaded portion 141 of sleeve 140. Piston 152 includes threaded portion 153 threadably engaged to threaded portion 154 of thrust rod 144 by ball-screw 152a or suitable low friction means. Bearing key 155 is attached to piston 152 and is adapted to engage key-slot 156 in sleeve 140. Key 155, like key 52 in the embodiment illustrated in FIG. 2 and 76 in the embodiment illustrated in FIG. 3, is key adapted to impart minimal resistance to the movement of the piston in an axial direction. Aperture 157 is provided through annular portion 150 of thrust rod 144 to provide fluid communication between opposite sides of the annular portion. Port 158 provides fluid communication to one side of piston 152 and port 159 provides fluid communication to the region on the opposite side of piston 152 through port 157.

In operation of the actuator illustrated in FIG. 5, fluid under pressure is admitted through port 158 thereby urging piston 152 to the right (as illustrated in FIG. 5). Piston 152, being threadably engaged to actuator rod 144 whose rotational movement is restrained by the virtue of a key or the non-circular surfaces of portion 146, rotates about the axis of the actuator, thereby driving sleeve 140 in the same direction. Rotational movement of sleeve 140 causes linear movement of sleeve 144 by virtue of the threaded engagement of the thrust rod to the sleeve.

Fluid under pressure admitted through port 159 and aperture 157 forces piston 152 in the opposite direction (to the left as illustrated in FIG. 5) thereby rotating the piston and sleeve in the opposite direction to impart linear motion to actuator rod 144.

FIG. 6 illustrates another actuator 160 in accordance with yet another modification of the present invention. Actuator 160 is similar to actuator 10 illustrated in FIG. 1 and includes a housing 161 having an internal cylindrical bore 162. Drive shaft 163 is journaled to housing 161 by bearings 164. Piston 165 is threadably engaged to threaded portion 166 of shaft 163 by a ball-screw or suitable low friction means and includes a key 167 engaged in helical key-slot 168 in bore 162.

Thrust rod 169 includes a threaded portion 170 threadably engaged to threaded portion 171 of shaft 163. Fastening means 172 is provided on housing 161 for fastening the housing to a fixed position and fastener means 173 is provided on thrust rod 169 for attachment to an element to be moved. Port 174 is in fluid communication within the chamber defined by bore 162 on one side of piston 165 and port 175 is in fluid communication with the portion of bore 162 on the opposite side of piston 165.

Control valves 176 and 177 are in fluid communication with ports 174 and 175, respectively, and are adapted to selectively connect ports 174 and 175 to conduit 178 in one position of the valves, or to vent 179 in the other position of control valves. Conduit 178 is connected through regulator valve 180 to a source of fluid under pressure. Actuator control means 181 is connected to a power supply at 182 to provide command signals to control valves 176 and 177 and to regulator valve 180. Position sensor 183 is connected to the shank of thrust rod 169 and provides an output signal via lead 184 to actuator control 181.

In operation of the actuator illustrated in FIG. 6, input command 185 delivers a signal to actuator control designed to move actuator rod 169 in a predetermined direction for a predetermined amount. The signal delivered by input command may, for example, be set by manual control at the input command. Actuator control 181 applies signals to control valves 176 and 177 and regulator valve 180 to selectively control their respective positions to apply fluid under pressure through one of ports 174 or 175 and to vent the other port to a source of low pressure. For example, actuator control 181 may move valves 176 and 177 to the positions illustrated in FIG. 6 wherein fluid under pressure is admitted through port 174 to drive piston 165 to the right (as illustrated in the drawings). Key-slot 168 controls rotational movement of piston 165. As piston 165 moves to the right (as illustrated in the drawing) it rotates clockwise (as viewed from the right side of the drawing) by virtue of the engagement key 167 to helical key-slot 168. Shaft 163 being threadably engaged to piston 165 rotates clockwise about its axis (as viewed from the right side of the drawing) to impart an axial movement of thrust rod 173. Sensor 183 senses the position of thrust rod and provides a signal on lead 184 representative of the position of thrust rod 173. When the thrust rod reaches its desired position, the actuator control provides a signal to valves 176, 177 and 180 to halt the further movement of thrust rod 173.

Although the control apparatus is illustrated in connection with the linear actuator illustrated in FIG. 6, it is to be understood that the control apparatus herein disclosed is equally operable with the other actuators herein disclosed, and similar control apparatus may be used therewith. Further, the actuators disclosed herein may be operated by other control apparatus.

One feature of the invention, particularly illustrated in FIG. 6 resides in the use of a helical key-slot so that the piston rotates about the axis of the actuator. Hence, the linear movement of thrust rod 173 is dependent upon the thread advance of the threaded portion 166 as well as the advance of the helical key slot.

The present invention thus provides a fluid operable linear actuator capable of imparting linear motion to an element. The actuator may be operated at relatively low temperatures, and even by cryogenic fluids. In this respect, the linear actuator is capable of being operated by existing fluid pressure supplies ordinarily found on board a space craft. Hence, the actuator according to the present invention is particularly useful in connection with operation by pressurized fuels or oxidizers used to propel space craft, or even by pressurized fluid used for other control functions.

One feature of the present invention resides in the fact that the fluid actuating force imparted on the piston is isolated from external forces on the thrust rod so that dynamic and static loading of the thrust rod does not affect the position of the piston. In this respect, the piston operates directly on a drive rod or sleeve which in turn is threadably coupled to the thrust rod to impart axial movement to the thrust rod.

Another feature of the present invention resides in the fact that the pitch angle and co-efficient of friction of the threads coupling the actuator shaft or sleeve to the thrust rod is such as to support external loading on the thrust rod. In this respect, when the tangent of the screw thread is smaller than the coefficient of friction between the mating surfaces of the thread, the axial loading on the thrust rod will not turn the drive sleeve or rod. Hence, the axial position of the thrust rod is irreversible regardless of the load on the thrust rod. For example, for three-pitch single acme threads having one mating surface constructed of lubricated bronze and the other mating surface constructed of steel, the coefficient of friction is 0.173. With a pitch diameter of 0.82 inches, the tangent of the thread angle is 0.116, which is less than the coefficient of friction, and the threads support the axial loading on the thrust rods without imparting rotational movement to the sleeve or drive shaft. Hence, the position of the piston may be fixed by virtue of the fluid pressure bearing against it so that the threads between the thrust rod and the drive means lock the position of the drive means to prevent linear movement of the thrust rod. This feature is particularly useful in connection with compressible fluids so that the position of the drive means is maintained regardless of the compressibility of the fluids. Dynamic and static loading on the thrust rods does not affect the position of the piston and hence does not affect the compressibility of the fluid.

Another feature of the present invention resides in the fact that the force imposed by the actuating fluid is isolated from external loading on the thrust rod so that loading on the thrust rod does not induce motion of the piston due to the compressibility of the actuating fluid. This feature permits use of compressible fluid without permitting the piston to "drift" in position.

Another feature of the present invention resides in the position of ball threads between the piston and the drive means so that the junction will not lock, even when subjected to severely low temperatures. Also, the low friction coupling between the piston and the drive means assures maximum transfer of motion between the piston and drive means.

Hence, the present invention provides a linear actuator capable of utilizing existing pressure supplies on board space crafts, and the like. The device is effective in operation and easily used and maintained.

This invention is not to be limited by the embodiments shown in the drawings and described in the description which are given by way of example and not of limitation, but only in accordance with the scope of the appended claims.

What is claimed is:

1. A fluid-operable linear actuator for providing precise positioning of a thrust rod over a continuous operating range, said actuator comprising: housing means having a bore and an axis; annular piston means disposed in said housing means about said axis for bidirectional movement therealong over a first continuous operating range; first means for controlling the radial position of said piston means; drive means journaled to said housing means substantially concentric with said axis for rotational movement thereabout, said drive means having an external threaded portion and an internal threaded portion; coupling means for providing low friction coupling from said piston means to said external threaded portion of said drive means to convert axial motion of said piston means to rotary motion of said drive means with low frictional loss; thrust rod means coaxially arranged with said housing means third for reciprocable motion therealong over a second continuous operating range, said thrust rod means having an externally threaded portion disposed within said housing means in threaded engagement with said internal threaded portion of said drive means; second means for controlling the radial position of said thrust rod means; and thrid means in said housing for enabling selective application of fluid pressure to opposite sides of said piston means, whereby a differential fluid pressure applied across said piston means axially moves said piston means over said first continuous operating range imparting rotational movement to said drive means which in turn imparts axial movement to said thrust rod means over said second continuous operating range until said differential pressure is removed, said piston means and said thrust rod means remaining in their respective axial positions in the absence of said differential fluid pressure.

2. Apparatus according to claim 1 wherein said thrust rod means comprises a pair of thrust rods threadably assembled to said drive means, the advance of the threads associated with one of said thrust rods and the advance of the threads associated with the other of said thrust rods being so disposed and arranged that the thrust rods are simultaneously moved in opposite directions upon rotation of said drive means.

3. Apparatus according to claim 2 wherein said thrust rods are disposed at axially opposite ends of said housing means so that a differential fluid pressure applied across said piston means in one axial direction urges the outward ends of said thrust rods axially outwardly from said housing means and a differential fluid pressure applied across said piston means in the opposite axial direction urges the outward ends of said thrust rods axially inwardly toward said housing means.

4. Apparatus according to claim 1 wherein said piston means includes a pair of substantially concentric sleeves, barrier wall means disposed between said sleeves, first toroidal diaphragm means mounted to said barrier wall means and disposed between said sleeves, and second toroidal diaphragm means mounted to said barrier wall means opposite said first toroidal diaphragm means and disposed between said sleeves, said third means comprising a first port in fluid communication with the interior of said first diaphragm means and a second port in fluid communication with the interior of said second diaphragm means.

5. Apparatus according to claim 1 wherein said first means comprises a key engaged to an axially extending key slot, one of said key and key slots being carried by said piston and the other of said key and key slots being carried by said bore.

6. Apparatus according to claim 5 wherein said key slot is disposed helically about said axis.

7. Apparatus according to claim 1 wherein the tangent of the threads of said threaded portions of said thrust rod means and said drive means is less than the coefficient of friction between said threads so that said thrust rod means will support loading without moving said drive means.

8. Apparatus according to claim 1 wherein said third means comprises first and second ports in fluid communication with respective opposite sides of said piston means.

9. The apparatus of claim 1 wherein said low friction coupling means comprises a plurality of ball screws disposed between the grooves of said external threaded portion of said drive means and said piston means.

10. The apparatus of claim 1 wherein said drive means comprises a rod having a solid portion providing said external threaded portion and a hollow portion providing said internal threaded portion, said solid portion terminating in a first end portion journaled in said housing means adjacent a first end thereof, said hollow portion terminating in a second end portion journaled within said housing means intermediate the ends thereof, and wherein said second means comprises an axially extending slot in said housing means and a key carried by said thrust rod means slidingly engaged in said slot.

11. The apparatus of claim 5 wherein said key comprises a low friction bearing key.

* * * * *